United States Patent [19]
Stephens et al.

[11] Patent Number: 6,039,280
[45] Date of Patent: Mar. 21, 2000

[54] MONITOR CABLE CADDY

[75] Inventors: Roger D. Stephens, 141 Wellesley Crescent, #303, Redwood City, Calif. 94062; Erwin Schmidmeister, Menlo Park, Calif.

[73] Assignees: Roger D. Stephens; Erwin Schidmeister, both of Redwood City, Calif.

[21] Appl. No.: 09/088,619

[22] Filed: Jun. 1, 1998

[51] Int. Cl.⁷ .................................................. B65H 75/38
[52] U.S. Cl. .................. 242/388.6; 242/399; 242/400.1; 242/402
[58] Field of Search ................................ 242/400.1, 402, 242/404, 404.1, 404.2, 404.3, 405.1, 405.2, 388.6, 399; 191/12.2 R

[56] References Cited

U.S. PATENT DOCUMENTS

| | | | |
|---|---|---|---|
| 121,135 | 11/1871 | Straffin | 242/404 |
| 965,648 | 7/1910 | Nace | 242/404.3 |
| 1,543,122 | 6/1925 | Ravenscroft | 242/404 |
| 1,910,597 | 5/1933 | Elliott | 242/404.3 |
| 2,030,875 | 2/1936 | Johnson | 242/399 |
| 2,118,731 | 5/1938 | Knott | 242/405.1 |
| 2,533,341 | 12/1950 | Alfano | 242/402 |
| 2,572,478 | 10/1951 | Hawkins | 242/400.1 |
| 2,587,707 | 3/1952 | Dever . | |
| 3,033,487 | 5/1962 | Walker | 242/405.1 |
| 3,924,819 | 12/1975 | Lapinskas | 242/405.1 |
| 3,970,264 | 7/1976 | Fredriksson et al. . | |
| 4,616,790 | 10/1986 | Beltran . | |
| 4,721,268 | 1/1988 | Lerner et al. . | |
| 5,265,822 | 11/1993 | Schober, Jr. et al. . | |
| 5,531,333 | 7/1996 | Vara . | |
| 5,613,648 | 3/1997 | Paavila | 242/405.2 |

FOREIGN PATENT DOCUMENTS

| | | | |
|---|---|---|---|
| 1472253 | 3/1967 | France | 242/404.2 |
| 1154193 | 5/1985 | U.S.S.R. | 242/400.1 |
| 2 264 925 | 9/1993 | United Kingdom . | |
| WO 94/15867 | 7/1994 | WIPO . | |

*Primary Examiner*—John M. Jillions
*Attorney, Agent, or Firm*—Douglas A. Chaikin; Peninsula IP Group

[57] ABSTRACT

Disclosed for shortening and housing medical monitor cables in the operating room and at the bedside is a cable caddy having a base, and a cable cartridge attached to a base by a column, optionally by a mortise and tenon, optionally by a stem projecting the cartridge and fixedly or slidably attached to the column. The cable cartridge includes a winding surface and, optionally, one or more end flanges with cable grasps thereon. Optionally, the winding surface defines a groove. Optionally and to the extent needed, the flanges, cable grasps, groove, columns, and slidably connected cartridge cooperate to retain the cable on the cartridge. A stem removable endwise from a column is disclosed. A stem removable only sideways when in a particular relative position is disclosed. A strap cooperating with a column to secure the base to a pole is disclosed; mounting screws are disclosed as an alternative.

15 Claims, 3 Drawing Sheets

MONITOR CABLE CADDY

BACKGROUND OF THE INVENTION

1. Field of the Invention

This invention relates generally to hospital emergency room and operating room equipment and particularly to the cleanliness and organization of such equipment at the patient's bedside. Most particularly, this invention relates to the placement and control of monitor cables associated with such equipment.

2. Background

Like all fields of medicine, the fields of Anesthesia and Intensive Care have aggressively adopted new technology. Modern operating rooms and emergency rooms are equipped with a wide variety of devices for diagnosing and treating life-threatening conditions and for monitoring a patients physiological status. As might be expected, the introduction of so many pieces of equipment into the operating field has created problems of its own. One such problem arises from the many cables, lines and tubes connecting the equipment to the patient. The cables complicate the movement of equipment, interfere with access to the patient and contaminate the operating field.

Cables that are too short limit the position of equipment and interfere with access to the patient. Cables that are too long drag bodily fluids and contaminants back and forth between the patient and nearby surfaces. Tangled cables cause confusion during an emergency. Snagged cables may cause personnel to drop objects, possibly injuring themselves or the patient. Cables dragging on the floor may be tripped over, pulled out or crushed beneath rolling carts. In an emergency, as more cables are attached and more specialists crowd around the patient, the likelihood of a mishap increases dramatically. The simple measure of keeping cables well organized and out of the way would help to avoid accidents, reduce confusion and maintain aseptic conditions around the patient.

Additionally, when a patient is moved or a monitor replaced, the cables must be disconnected from the patient, the monitor or both. It is often preferable to keep the cables attached to the patient, sometimes connecting the cables to a portable monitor which travels with the patient. Delay and annoyance should be avoided. It would therefore be most advantageous to keep the cables well organized while swapping monitors or moving the patient.

What is needed is a simple device for fixing and adjusting the length of a monitor cable so that the cable is less likely to tangle or drag. What is also needed is such a device for keeping excess lengths of cable in a clean place out of the way of personnel and equipment. What is especially needed is such a device which performs these functions even as cables are being disconnected and reconnected.

SUMMARY OF THE INVENTION

It is an object of the present invention to make emergency rooms and operating rooms safer and more efficient by reducing clutter and contamination.

It is an additional object to keep bedside monitoring equipment cables out of the way of personnel and away from sources of contamination.

It is an additional object of the present invention to provide a means of quickly and easily adjusting the length of the cable and a simple, sure means of fixing the length of the cable in the mean time.

It is an additional object of the present invention to position the cable for easy deployment from bedside equipment without sacrificing the portability of the equipment and, especially, to keep one or several cables well organized and appropriately shortened as the cables are disconnected from one monitor and reconnected to another.

In accordance with the above objects and those that will be mentioned and will become apparent below, a cable caddy according to the present invention comprises:

a base and at least one cable cartridge, the cable cartridge having a first end, a second end, and a body defining a winding surface therebetween;

the first end being attached to the base;

the second end including a flange, whereby a length of cable is wound about the body and the flange prevents the cable from sliding off the second end of the cartridge.

In an exemplary embodiment of a cable caddy according to the present invention, at least one end of the cable cartridge includes a flange which defines a notch which serves as a cable grasp into which the cable may conveniently be lodged so that it does not unwind from the cartridge body.

In another exemplary embodiment of a cable caddy according to the present invention, the notch has a narrowed inlet. This reduces the likelihood that a cable will be dislodged from the notch.

In preferred embodiment of a cable caddy according to the present invention, the cable winding surface of the cable cartridge body defines a groove near the second end. If the last winding of cable is pulled snugly in the groove, the cable will tend to pass from the groove, adjacent the flange of the second end of the cartridge, to the notch, where the cable must bend in order to pass through the notch. This allows the cable to lodge more tightly in the notch.

In another exemplary embodiment of a cable caddy according to the present invention, a mortise and tenon joint connects the first end of the cartridge to the base. This provides for ready assembly and disassembly of the cable caddy.

In another exemplary embodiment of a cable caddy according to the present invention, the winding surface of the cable cartridge body is eccentric in profile. Compared with a cylinder of diameter comparable to the minor dimension of the winding surface, this provides capacity for a greater length of cable per winding.

Also in accordance with the above objects and those that will be mentioned and will become apparent below, a cable caddy according to the present invention comprises:

a base;

at least one column projecting from the base; and at least one cable cartridge having a first end, a second end, a body defining a winding surface therebetween, and a stem attached to the first end of the cartridge, the stem being attached to the column, the stem having an elevated position and a retracted position relative to the base, whereby a length of cable may be wound or unwound from the cartridge body in the elevated position and the cartridge may be retracted to confine the cable close to the base.

In an exemplary embodiment of a cable caddy according to the present invention, two or more cable cartridges are affixed to a base. This provides for the management of two or more cables with the same caddy.

In another exemplary embodiment of a cable caddy according to the present invention, a column rises from the base near the second end of a cable cartridge to shield the cartridge from impacts and, depending on location, height and the type of cable being used, to help confine the cable on the cartridge.

In another exemplary embodiment of a cable caddy according to the present invention, a column projects from the base and a stem projects from the first end of the cable cartridge. A rail and slot slidably connect the stem to the column. This allows a user of the cable caddy to move the cable cartridge to an elevated position for easy winding or unwinding of cable and then to move the cartridge to a retracted position so that it is out of the way.

In another exemplary embodiment of a cable caddy according to the present invention, the rail includes an enlarged end portion and the slot. The slot includes a receiving space for receiving the enlarged end portion and an enlarged opening adapted to allow the enlarged end portion to be placed in the receiving space. The enlarged end portion is free to slide longitudinally within the receiving space. The receiving space includes an inner retaining surface which interferes with the enlarged end portion to prevent escape of the enlarged end portion of the rail from the receiving space except via the enlarged opening of the slot. The enlarged opening is located so that escape is possible only when the cartridge is in an intermediate position relative to the base.

In another exemplary embodiment of a cable caddy according to the present invention, a column projects from the base near a second end of a cartridge. When the cartridge is lowered, this column shields the cartridge from mechanical interference and helps to prevent accidental unwinding of the cable.

In another exemplary embodiment of a cable caddy according to the present invention, a plurality of columns project from the base and a plurality of straps are disposed about the base therebetween. The straps hold the base to a pole or other vertical member at a patient's bedside. The columns interfere with the straps to prevent the base from sliding free of the straps.

An advantage of the present invention is that with simple movements and minimal observation a person can adjust and fix the length of a monitor cable.

Another advantage of the present invention is that cables having a wide variety of mechanical and surface properties can be kept wound on the cartridge body by the cooperation of several features of the cable caddy including the elevation or retraction of the cartridge relative to the base, the proximity of a column to the second end of the cartridge, the presence of a flange on the second end of the cartridge, the passage of the cable through a cable grasp located on one or both ends of the cartridge, and the placement of a final winding of cable in a groove on the winding surface of the cartridge.

Another advantage of the present invention is that with quick simple movements and little attention a person can raise the cable cartridge to gain access to excess cable, adjust and fix the length of the cable, and lower the cable cartridge so that the cartridge is out of the way, protected from mechanical interference and unlikely to release the cable.

Another advantage of the present invention is that a cable already wound on a cartridge may be disconnected from a first monitor and connected to a second monitor without being unwound from the cartridge. At the same time, the cartridge may be quickly detached from the base on the first monitor and attached to the base on the second monitor.

Another advantage of the present invention is that the base can be readily secured to a pole or beam by means of straps while columns projecting from the base prevent the base from sliding free of the straps.

BRIEF DESCRIPTION OF THE DRAWING

For a further understanding of the objects and advantages of the present invention, reference should be had to the following detailed description, taken in conjunction with the accompanying drawing, in which like parts are given like reference numerals and wherein.

DETAILED DESCRIPTION OF THE INVENTION

Figure 1:
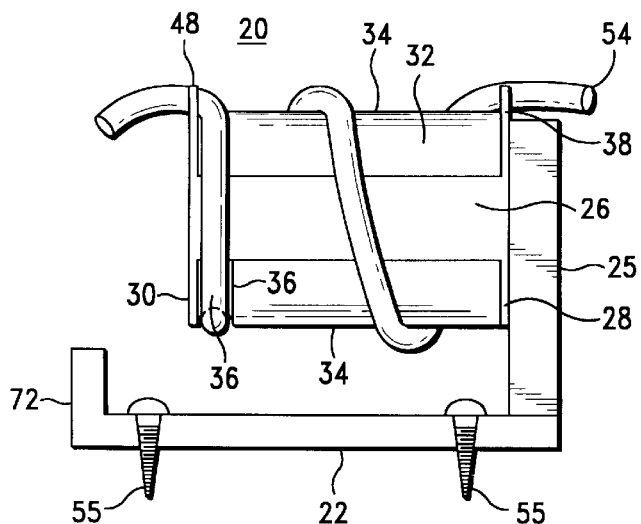
FIG. 1 is a side view of an exemplary embodiment of a cable caddy according to the present invention with a cable wound thereon.

The invention will now be described with reference to FIG. 1 in which an exemplary embodiment of the cable caddy 20 according to the present invention is depicted as seen from one side. The cable caddy 20 includes a base 22 and a column 25 projecting from the base 22. A cable cartridge 26 is attached to the column 25. Optionally, the column 25 may be joined to the base 22 by a mortise and tenon assembly (not illustrated). Optionally, a plurality of mounting screws 55 are used to attach the base 22 to a suitable surface, such as a surface of a piece of equipment. Alternatively, at least one and preferably a plurality of straps (not illustrated in this figure) are used to secure the base to a surface, such as a pillar or tube, in the operating room or near the patient's bedside.

The cable cartridge 26 includes a first end 28, a second end 30 and a body 32 therebetween. The body 32 of the cartridge 26 defines a winding surface 34. In a preferred embodiment, the winding surface 34 is not cylindrical but oval so as to accommodate a greater length of cable per winding. The winding surface 34 includes a groove 36 deep enough to accommodate at least one winding of a cable 54.

Figure 2:
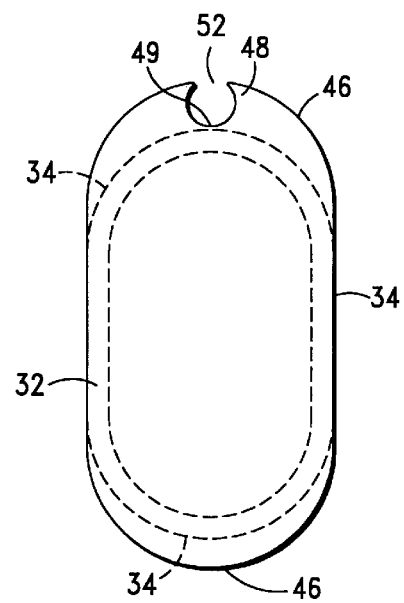
FIG. 2 is an end view of a cable cartridge of such an exemplary embodiment.

Continuing with reference to FIG. 1 and referring also to FIG. 2, which shows an end view of this exemplary embodiment, the first end 28 includes a first flange 38 optionally defining a first notch 41 having a restricted inlet 44. The first notch 41 and inlet 44 form a first cable grasp 40. The second end 30 includes a second flange 46 preferably defining a second notch 49 having a restricted inlet 52. The second notch 49 and inlet 52 form second cable grasp 48.

As can be seen in FIG. 1, a cable 54 wound on the body 32 may begin to unwind and fall off of the second end 30 of the cartridge 26. However, the second flange 46 interferes with the cable 54, rendering unwinding less likely. Additionally, the notch 49 and inlet 52 of the cable grasp 48 are sized and configured so that the cable 54 will ride in the notch 49. Thus, the second cable grasp 48 and the second flange 46 cooperate to resist accidental unwinding of the cable 54.

Figure 4:
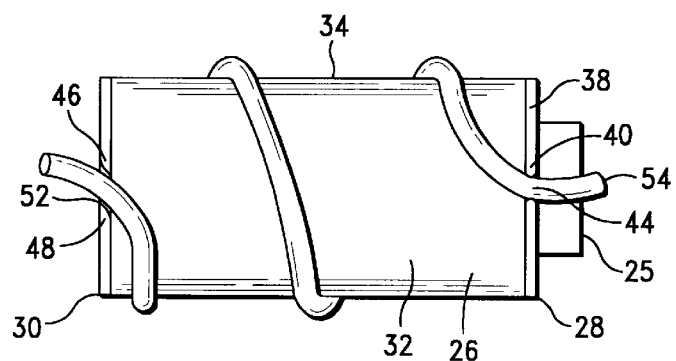
FIG. 4 is a top view of a cable cartridge of such an exemplary embodiment with a cable wound thereon.

Referring now to FIG. 4, the notch 49, a variation on this exemplary embodiment is shown in which the inlet 52 or both are angled (not illustrated) relative to the second flange 46. This provides a means for reducing the curvature of the cable 54 when the cable 54 is at rest in the cable grasp 48, when the cable 54 is being introduced through the inlet 52, or at both times.

Referring back to FIGS. 1 and 2, the second flange 46 may optionally extend beyond the winding surface 34 proximate the groove 36 in order to assist in confining the cable 54 to the winding surface 34. Also optionally, a guard column 72 projects from the base 22 proximate the second end 30 of the cable cartridge 26. The guard column 72 protects the cable cartridge 26 from inadvertent contact and helps prevent inadvertent unwinding of the cable 54. Where a strap (not illustrated in FIG. 1) is used to secure the base to a pillar or tubular member in the operating room or near the bedside, and particularly if the pillar is vertical, it will be appreciated that the guard column 72 will interfere with the strap to prevent the base 22 from slipping free of the strap.

Figure 3:
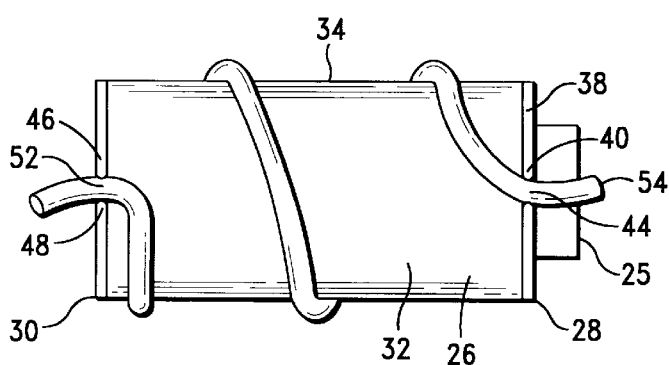
FIG. 3 is a top view of a cable cartridge of such an exemplary embodiment with a cable wound thereon.

In use, continuing with reference to FIG. 1 and now also referring to the top view shown in FIG. 3, a cable 54 is passed through the first grasp 40, wound manually about the winding surface 34 of the body 32 of the cartridge 26 and passed through the second grasp 48 so that the cable 54 remains wound on the body 32. If the cable 54 has an appreciable stiffness, the retention of the cable 54 in the caddy 20 can be improved by passing the cable 54 through the groove 36 and then through the second grasp 48. Depending on how the notch 49 and inlet 52 are dimensioned, formed and angled, it will be appreciated that the groove 36 and the second grasp 48 cooperate to lodge the cable 54 in the second grasp 48, rendering accidental unwinding of the cable 54 less likely; yet it remains convenient to intentionally remove the cable 54 from the grasp 48.

Figure 5:
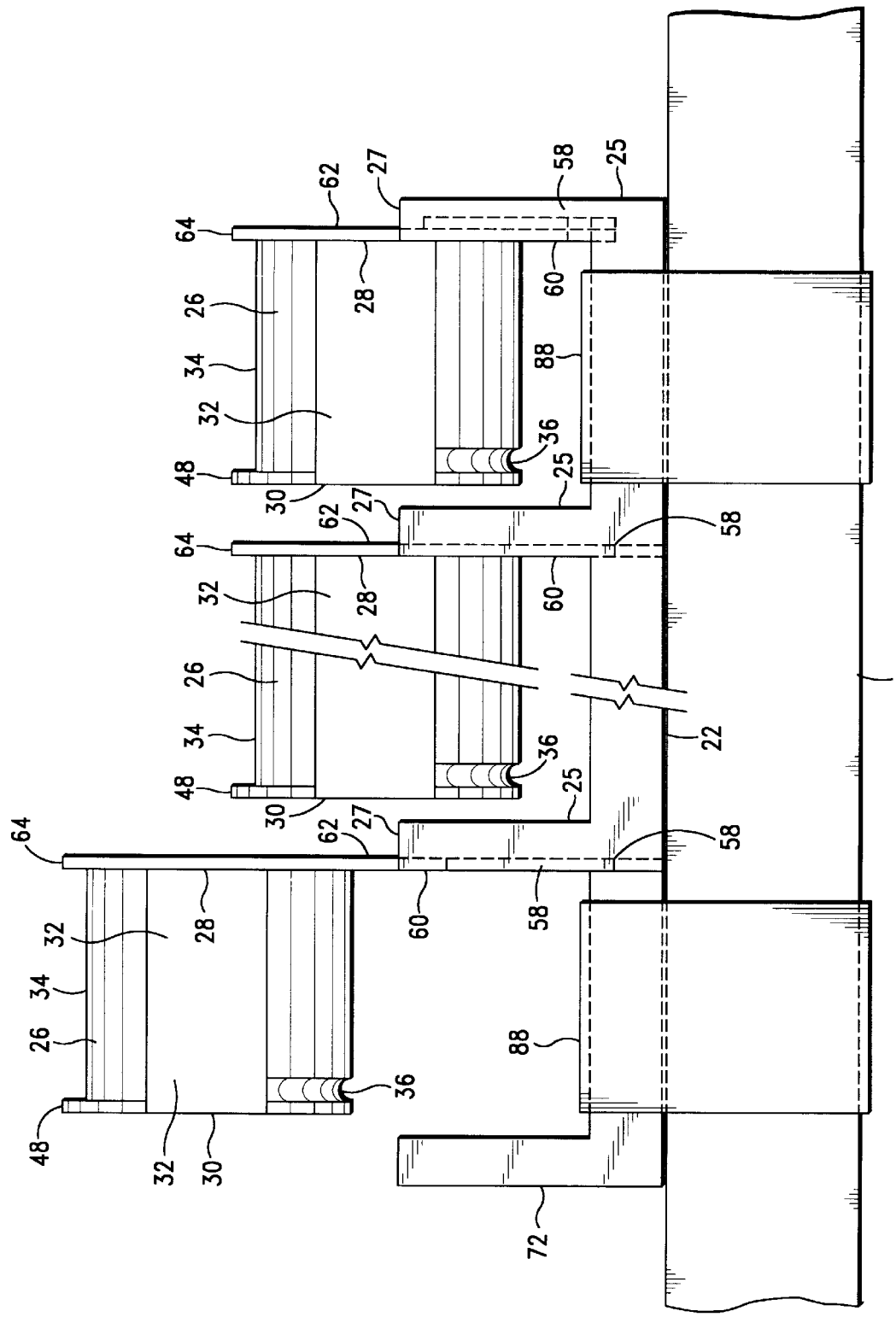
FIG. 5 is a side view of an exemplary embodiment of a cable caddy according to the present invention.
Figure 6:
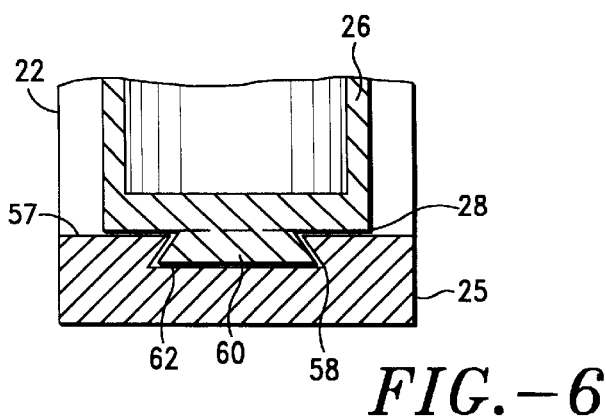
FIG. 6 is a top view of an exemplary embodiment of the present invention showing an end of a cable cartridge engaged with a support column.
Figure 7:
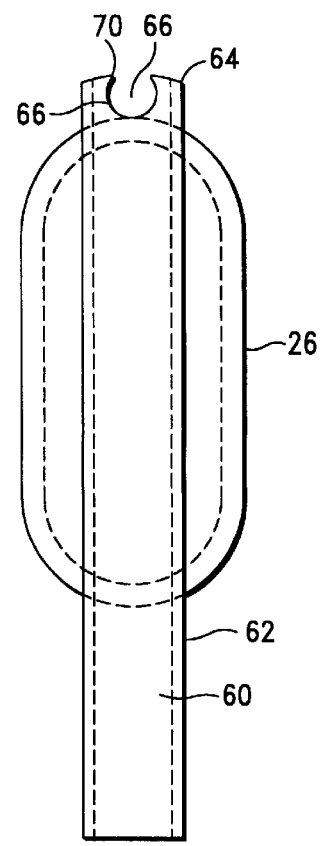
FIG. 7 is an end view of the embodiment of FIG. 6 showing a cable cartridge end and stem.

Referring now to FIGS. 5 through 7, another exemplary embodiment of a cable caddy according to the present invention includes a base 22 and a plurality of support columns 25 projecting from the base 22. Each support column 25 has a distal end 27 and a lateral surface 57 defining a longitudinal slot 58 having a dovetail profile as illustrated in FIG. 6. A plurality of cable cartridges 26 are provided each having a first end 28, a second end 30 and a body 32 defining a winding surface 34 therebetween, the detail and variations of which are described hereinabove with reference to FIGS. 1–3. At least one and preferably a plurality of straps 88 secure the base to a pillar 90 or other member in the operating room or near the patient's bedside.

Referring now to FIGS. 6 and 7, a stem 62 is attached to the first end 28 of the cable cartridge 26. The stem 62 defines a rail 60 having a dovetail profile adapted to fit snugly yet slidably within the slot 58. The rail 60 is disposed in the slot 58 and fits tightly enough therein to retain the stem 62 and cable cartridge 26 on the support column 25 at a fixed height until a user of the cable caddy deliberately lifts or depresses the cartridge 26. Thus, a user of the cable caddy may wind or unwind cable 54 from the cartridge 26 and then, if desired, push the cartridge 26 down so that the cartridge 26 is out of the way. The dimensions and snugness of the rail 60 and slot 58 will depend, for example, on the estimated total weight of the cable cartridge 26 when loaded to capacity with the cable for which it is designed.

In another, similar exemplary embodiment, the support column 25 is oriented vertically. The slot 58 communicates with the distal end 27 of the support column 25. The rail 60 and slot 58 fit loosely enough that once the rail 60 and slot 58 are approximated, the user can release the cartridge 26, whereupon the stem 62 will drop into place by operation of gravity. This embodiment permits quick vertical elevation and removal of the cartridge 26 from the base 22.

As seen in FIG. 7, the stem 62 has an end 64, proximate the first end 28 of the cable cartridge 26, optionally defining a notch 68 having a restricted inlet 70. The notch 68 and inlet 70 form a cable grasp 66. The cable grasp 66 assists in retention of a cable 54 in the manner set forth above for the first cable grasp 40 of the embodiment illustrated in FIG. 3. The dimensions and contour of the cable grasp 66 of this embodiment and the second cable grasp 48 of this embodiment (illustrated in FIGS. 1–3) will depend on the diameter, stiffness, sturdiness and frictional qualities of the cable 54 and on the intentional and unintentional forces that the cable 54 and the cable caddy 20 are designed to withstand. For example, a cable which is extremely pliable and easily compressed might conveniently be retained by the second flange 46, possibly with the aid of the second cable grasp 48 in which case the cable would ride in the second notch 49 under the influence of gravity.

Contrastingly, a stiff cable might tend to unwind from the body 32 and even to pop out of the first notch 41 and second notch 49. Such a cable might more effectively be retained by first and second cable grasps 40 and 48 including restricted first and second inlets 44 and 52 (embodiment of FIGS. 1–3; cable grasp 66 and second cable grasp 48 for embodiment illustrated in FIG. 4). However, if such a stiff cable is intolerant of being pinched or of being bent sharply at the second cable grasp 48, then it may be preferable to provide a relatively smooth, loose, angled, or deformable second cable grasp 48 and to allow the cable 54 to ride in the groove 36 before passing through the cable grasp 48. In this way, the distance between the groove 36 and the second cable grasp 48 may provide a bending force strong enough to lodge the cable 54 in the second cable grasp 48 but gentle enough to be tolerated by the cable.

As seen in FIG. 5, a guard column 72 projects from the base 22 proximate the second end 30 of the cable cartridge 26. The guard column 72 protects the cable cartridge 26 from inadvertent contact and helps prevent inadvertent unwinding of the cable 54 when the cartridge 26 has been pushed down and out of the way. The dimensions of the guard column 72 (and of the column 25 generally) and the positions thereof relative to the second ends 30 may be determined according to the type of cable 54 that is to be accommodated.

Figure 8:
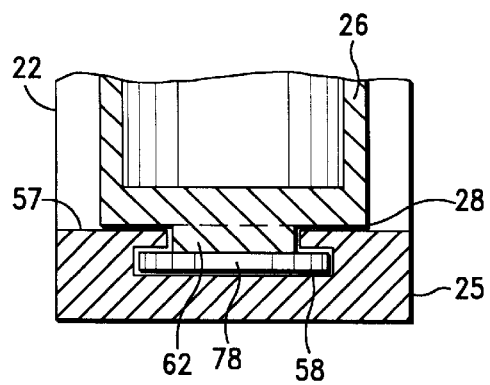
FIG. 8 is a top view of an exemplary embodiment of the present invention showing an end of a cable cartridge engaged with a support column.
Figure 9:
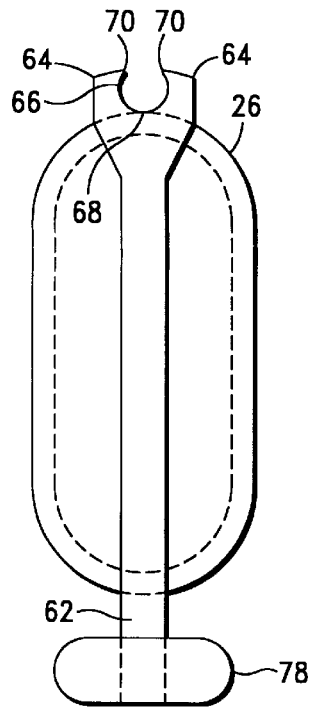
FIG. 9 is an end view of the embodiment of FIG. 8 showing a cable cartridge end and stem.

Referring again to FIG. 5 and now also to FIGS. 8 and 9, an exemplary embodiment of a cable caddy is shown wherein the stem 62 defines a rail 60 adapted to fit snugly yet slidably within a slot 58 defined in a lateral surface 57 of a support column 25. The rail 60 is disposed in the slot 58 and fits tightly enough therein to retain the stem 62 and cable cartridge 26 on the support column 25 at a fixed distance from the base 22 until a user of the cable caddy deliberately extends or retracts the cartridge 26. Thus, a user of the cable caddy may wind or unwind cable 54 from the cartridge 26 and then, if desired, push the cartridge 26 toward the base 22 so that the cartridge 26 is out of the way. The dimensions and snugness of the rail 60 and slot 58 will depend, for example, on the estimated total weight of the cable cartridge 26 when loaded to capacity with the cable for which it is designed.

Figure 10:
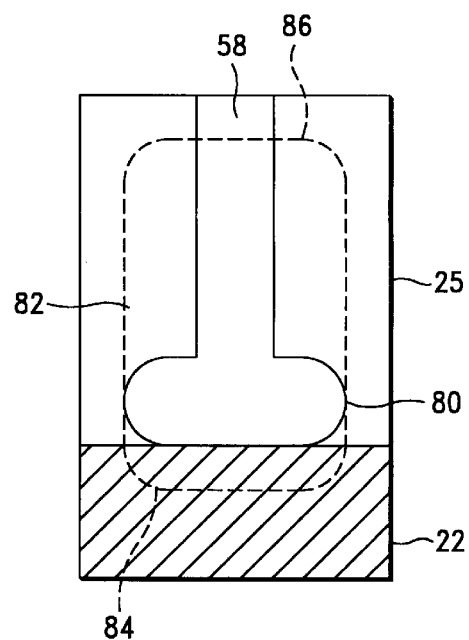
FIG. 10 is a lateral view of the embodiment of FIG. 8 showing a support column having a receiving space and enlarged opening.

Continuing with particular reference to FIGS. 8 and 9 and now also with reference to FIG. 10, the rail 60 includes an enlarged end portion 78. The lateral surface 57 defines within the support column 25 a receiving space 82 large enough to accommodate longitudinal movement of the enlarged end portion 78 of the rail 60. The lateral surface 57 also defines a proximal inner surface 84 and a distal inner surface 86. The proximal and distal inner surfaces 84 and 86 limit the longitudinal movement of the rail 60 relative to the slot 58.

Additionally, the lateral surface 57 of the support column 25 defines an enlarged opening 80 capable of receiving the end portion 78 of the rail 60 so that the rail 60 can be engaged in the slot 58. However, the enlarged opening 80 is located on the support column 25 such that the enlarged end portion 78 of the rail 60 must be at an intermediate longitudinal position in order to fit through the enlarged opening 80. When the stem 62 fully extended or fully retracted relative to the support column 25, the enlarged end portion 78 is not aligned to escape through the enlarged opening 80. In order to disengage the rail 60 from the slot 58 and detach the cartridge 26 from the column 25 and base 22, a user must first partially retract the cartridge 26 so that the enlarged end portion 78 is aligned with the enlarged opening 80.

Particular advantages of the present invention are realized when it becomes necessary to move the patient and leave the monitor behind, or to exchange monitors while the patient remains stationary. In the use of the present invention, the base 22 will typically be strapped to a pillar 90 (FIG. 5), pole or other elongated member associated with the patient's bed or beside environment. A second base will typically be strapped to a monitor or to an equipment cart. Rather than detach either base, it is a simple matter to unplug the cables, detach each cartridge from one base and attach it to the other. The patient may then be moved, or the monitors exchanged, and the cables may be reconnected to the appropriate monitor. The bases 22 stay with their respective monitors or bedsides. The cables 54 and cartridges 26 move with the patient. Personnel are spared time and labor and the patient is spared unnecessary disturbance. Cables are shortened and organized and kept clean and out of the way as described above.

It will also be appreciated that the base 22 and support column 25 may inexpensively be injection molded as a single piece from a suitable polymer resin. The cartridge 26 and stem 62 may be made in like fashion. Such articles are easily cleaned and disinfected by immersion, autoclaving and the like.

While the foregoing detailed description has described several embodiments of the cable caddy in accordance with this invention, it is to be understood that the above description is illustrative only and not limiting of the disclosed invention. The invention is to be limited only by the claims as set forth below.

What is claimed is:

1. A cable caddy for shortening and securing a length of cable, the cable caddy comprising:
   a base and at least one cable cartridge, the cable cartridge having a first end, a second end, and a body defining a winding surface therebetween;
   the first end being attached to the base;
   the second end including a flange, the flange defining a notch having a narrowed inlet; and
   the cartridge body having a longitudinal axis and at least one of the notch and the inlet defining a path at an angle relative to the longitudinal axis, the angle being intermediate between parallel and perpendicular to the longitudinal axis,
   whereby a length of cable is wound about the body and the flange prevents the cable from sliding off the second end of the cartridge and whereby removal of a cable resting in the notch is resisted.

2. A cable caddy as set forth in claim 1, wherein the flange of the first end of the cartridge defines a cable grasp.

3. A cable caddy as set forth in claim 1, wherein the flange of the second end has an inner surface proximate the winding surface and the winding surface defines a groove proximate the second end, whereby a portion of the length of cable proximate the second end may be wound in the groove so as to enter the grasp at a shallow angle with respect to the inner surface of the flange.

4. A cable caddy as set forth in claim 1, wherein the winding surface has an oval profile.

5. A cable caddy as set forth in claim 1, further comprising at least one strap disposed about the base, the strap being capable of securing the base to a solid object.

6. A cable caddy as set forth in claim 1, wherein a guard column projects from the base proximate a second end of a cable cartridge, whereby the second end of the cable cartridge is at least partially shielded from mechanical interference.

7. A cable caddy for shortening and securing a length of cable, the caddy comprising:
   a base;
   at least one column projecting from the base; and
   at least one cable cartridge having a first end, a second end, a body defining a winding surface therebetween, and a stem attached to the first end of the cartridge, the stem being attached to the column, the stem having an elevated position and a retracted position relative to the base; and
   the column projecting from the base proximate the second end of the cable cartridge, the column shielding the second end of the cable cartridge from mechanical interference and the column interfering with the unwinding of the cable from the cartridge when the cartridge is in the retracted position,
   whereby a length of cable may be wound or unwound from the cartridge body in the elevated position and the cartridge may be retracted to confine the cable close to the base.

8. A cable caddy as set forth in claim 7, wherein the second end defines a flange, whereby the flange assists confinement of the cable on the cartridge body.

9. A cable caddy as set forth in claim 7, wherein:
   the column has a first lateral surface;
   the stem has a second lateral surface;
   one of the first and second lateral surfaces defines a longitudinal slot and the other thereof defines the rail, the rail being disposed in the slot, the rail and slot slidably connecting the stem to the column while restricting lateral and rotational movements of the stem relative to the column; and
   the cartridge is slidable between an elevated position and a retracted position relative to the base, whereby the cartridge may be pulled to the elevated position, an excess length of cable may be wound about the cartridge body, and the cartridge may then be pushed to the retracted position to secure the excess length.

10. A cable caddy as set forth in claim 9, wherein:

the lateral surface that defines the slot defines an open distal end of the slot; and the rail is removable from the slot via the end of the slot, whereby the cartridge is readily removable from the base.

11. A cable caddy as set forth in claim 9, wherein the slot and groove are formed with complementary dovetail profiles.

12. A cable caddy as set forth in claim 9, wherein:

the cartridge has an estimated loaded weight; and the rail and slot resist sliding sufficiently to hold the cable cartridge at a constant distance from the base when the cartridge is loaded at the estimated loaded weight and the column is oriented vertically, whereby the cartridge may be pulled up, an excess length of cable may be wound about the cartridge body, and the cartridge may then be pushed down to secure the excess length.

13. A cable caddy as set forth in claim 9, wherein:

the lateral surface that defines the rail defines thereon an enlarged end portion;

the lateral surface that defines the slot defines a receiving space capable of receiving the enlarged end portion of the rail;

the lateral surface that defines the slot further defines therein an enlarged opening capable of receiving the enlarged end portion of the rail, the enlarged opening and the enlarged end portion being so located relative to the slot and rail, respectively, that the opening and the end portion are aligned only when the cartridge is in an intermediate position between the elevated position and the retracted position relative to the base; and the lateral surface that defines the receiving space further defines an inner retaining surface, the inner retaining surface limiting the longitudinal movement of the stem relative to the column, whereby the cartridge is detachable from the base only when in an intermediate position relative to the base.

14. A cable caddy as set forth in claim 9, wherein:

at least two columns project from the base; and at least one strap is disposed about the base between the columns, the strap being capable of securing the base to a solid member, whereby a column interferes with a strap to prevent the base from sliding out from under the strap.

15. A cable caddy as set forth in claim 9, wherein the second end of the cartridge includes a flange having an inner surface proximate the winding surface, the flange forms a cable grasp including a notch and a narrow inlet, and the winding surface defines a groove proximate the second end, whereby a portion of the length of cable proximate the second end may be wound in the groove so as to enter the grasp at a shallow angle with respect to the inner surface of the flange.

* * * * *